United States Patent
Fevrier (12)

(10) Patent No.: US 10,404,374 B1
(45) Date of Patent: Sep. 3, 2019

(54) OPTICAL NETWORKING WITH SUPPORT FOR UNIDIRECTIONAL OPTICAL LINKS

(71) Applicant: Neptune Subsea IP Limited, London (GB)

(72) Inventor: Herve A. Fevrier, Miami, FL (US)

(73) Assignee: Neptune Subsea IP Limited, London (GB)

(*) Notice: Subject to any disclaimer, the term of this patent is extended or adjusted under 35 U.S.C. 154(b) by 0 days.

(21) Appl. No.: 16/398,863

(22) Filed: Apr. 30, 2019

Related U.S. Application Data (63) Continuation of application No. 15/152,358, filed on May 11, 2016, now Pat. No. 10,320,484, which is a
(Continued)

(51) Int. Cl.
*H04J 14/02* (2006.01)
*H04B 10/2581* (2013.01)
(Continued)

(52) U.S. Cl.
CPC ....... *H04B 10/2581* (2013.01); *H04B 10/275* (2013.01); *H04B 10/40* (2013.01); *H04J 14/021* (2013.01)

(58) Field of Classification Search
CPC .. H04B 10/2581; H04B 10/275; H04B 10/40; H04J 14/021
(Continued)

(56) References Cited

U.S. PATENT DOCUMENTS 5,299,314 A * 3/1994 Gates ................... G06F 13/385
709/250
7,675,867 B1  3/2010 Mraz et al.
(Continued)

FOREIGN PATENT DOCUMENTS

GB 2503245 A 12/2013

OTHER PUBLICATIONS

Notification of Transmittal of the International Search Report and the Written Opinion of the International Searching Authority, or the Declaration dated Aug. 9, 2016 in connection with International Application No. PCT/GB2016/051320, 12 pages.
(Continued)

*Primary Examiner* — Tesfaldet Bocure (57) ABSTRACT

An apparatus includes first bidirectional communications equipment having a transmitter and a receiver. The first bidirectional communications equipment is configured to operate in at least a first configuration and a second configuration. In the first configuration, the first bidirectional communications equipment is configured to provide a bidirectional communication link with a transmitter and a receiver of second bidirectional communications equipment. In the second configuration, the first bidirectional communications equipment is configured to provide (i) a first unidirectional communication link between the transmitter of the first bidirectional communications equipment and the receiver of the second bidirectional communications equipment and (ii) a second unidirectional communication link between the receiver of the first bidirectional communications equipment and a transmitter of third bidirectional communications equipment.

20 Claims, 4 Drawing Sheets

Related U.S. Application Data continuation of application No. PCT/GB2016/051320, filed on May 9, 2016.

(60) Provisional application No. 62/159,694, filed on May 11, 2015.

(51) Int. Cl.
   *H04B 10/40* (2013.01)
   *H04B 10/275* (2013.01)

(58) Field of Classification Search
   USPC .................................. 398/79; 375/219, 220
   See application file for complete search history.

(56) References Cited

U.S. PATENT DOCUMENTS

| | | | | |
|---|---|---|---|---|
| 9,299,423 B2* | 3/2016 | Baker | ............... | G06F 13/16 |
| 2002/0012138 A1* | 1/2002 | Graves | ............... | H04Q 11/0062 |
| | | | | 398/66 |
| 2003/0194234 A1 | 10/2003 | Sridhar et al. | | |
| 2004/0202472 A1 | 10/2004 | Giles et al. | | |
| 2005/0111788 A1* | 5/2005 | Tsuyama | ............... | H04B 10/40 |
| | | | | 385/24 |
| 2005/0185961 A1 | 8/2005 | Bhalla et al. | | |
| 2006/0110159 A1 | 5/2006 | Hurt et al. | | |
| 2007/0237164 A1* | 10/2007 | Gazzola | ............... | H04J 3/1611 |
| | | | | 370/419 |
| 2008/0037988 A1* | 2/2008 | Bullock | ............... | H04J 14/0227 |
| | | | | 398/59 |
| 2010/0322618 A1* | 12/2010 | Zheng | ............... | H04J 3/14 |
| | | | | 398/2 |

OTHER PUBLICATIONS

International Preliminary Report of Patentability for International Application No. PCT/GB2016/051320 dated Nov. 14, 2017, 8 pages.

* cited by examiner

OPTICAL NETWORKING WITH SUPPORT FOR UNIDIRECTIONAL OPTICAL LINKS

CROSS-REFERENCE TO RELATED APPLICATIONS AND PRIORITY CLAIM

This application is a continuation of U.S. patent application Ser. No. 15/152,358 filed on May 11, 2016, now issued as U.S. Pat. No. 10,320,484 on Jun. 11, 2019 which claims priority under 35 U.S.C. § 119(e) to U.S. Provisional Patent Application No. 62/159,694 filed on May 11, 2015 and which claims priority as a continuation of PCT Patent Application No. PCT/GB2016/051320 filed on May 9, 2016. All of these patent applications are hereby incorporated by reference in their entirety.

TECHNICAL FIELD

The present disclosure relates to an optical network, optical networking equipment, and a method of provisioning an optical network.

BACKGROUND

Telecommunication networks are networks that allow communication of information over a distance, and often a great distance, via the use of electromagnetic signals. Telecommunication networks based on propagation of electronic signals through electrical conductors have been available since the time of the telegraph. Telecommunication networks based on propagation of optical signals have been a more recent development. Regardless, the invention and improvement in the ability of human beings to communicate over distances, often great distances, have presented a paradigm shift in human interaction, greatly benefiting human civilization.

Conventional telecommunications technology represents the culmination of decades, and in some cases, centuries of human thought and collaboration. At present, sophisticated optical communication networks are capable of transmitting tens of trillions of bits of information per second over a single optical fiber spanning from a few kilometers to a few thousands of kilometers. Optical networks generally exceed the bandwidth capabilities of wired copper networks. Accordingly, optical networks often provide optical backbones at the core of the telecommunication networks.

Typically, these core optical networks use Dense Wavelength Division Multiplexed (DWDM) optical systems in which optical channels (referred to as "DWDM channels") are allocated by frequency range. These optical systems employ equipment in different sites of the network, each site composed of network elements that constitute the physical layer of the network. Conventional optical networks are often mesh networks with protection and restoration capabilities, and in which there are Reconfigurable Optical Add/Drop Multiplexers (ROADMs) at the nodes of the mesh network.

Optical networks are often configured and provisioned through a "network management system", which allows one or more people in a network operations center to change the configuration of the network, to monitor the activity and performance of the network, and so forth.

The ROADMs are typically multi-degree ROADMs, which means that there are different possible paths starting and ending from each multi-degree ROADM node. The number of degrees is the number of paths.

A second type of node is in-line amplifiers (ILA). These in-line amplification nodes may use Erbium-doped fiber amplifiers (EDFAs) and can also use Raman amplification (alone or in combination with EDFAs).

Raman amplification can be used to extend the optical reach (by improving the Optical Signal to Noise Ratio—OSNR) and/or expanding the optical bandwidth of the DWDM optical systems and therefore the capacity.

A third type of node is emerging today and is named optical transport network (OTN) switches. OTN switching are nodes with optoelectronic conversion. These are not all-optical nodes like ILA and ROADM nodes.

Telecommunication networks started because of voice traffic needs. They started based on the provisioning of circuits in order to put in communications two sites, A and B. The circuit was bidirectional, which means A talks to B and B talks to A. The capacity in each direction is the same.

This has been true from the 64 kbit/s circuit up to the high-speed/high-capacity channels in the different hierarchies of optical networks: Sonet/SDH, OTN, etc.

It is known that now data traffic has overpassed voice traffic in terms of volume. Data traffic is often based on networks using Internet Protocol (IP).

Data traffic is sometimes bidirectional but can also be unidirectional. Bidirectional means that the same capacity is required in both directions between the two sites of communications. Unidirectional means traffic is going only in one direction (or essentially in one direction, as there is the possibility of the need for a small capacity in the other direction in order to acknowledge to the emitting site that the flow of communications is going well).

An example of the need for unidirectional traffic is the copy of a database from one site to another site. Bidirectional and unidirectional traffic types are two extremes, and intermediate cases are also possible. Therefore, one could characterize traffic by its asymmetry.

Despite the emergence of asymmetric traffic, optical networks conventionally have optical circuits provisioned in a bidirectional fashion. This is in adherence to ITU-T standards (see website itu.org). One fundamental object in optical networks provisioned in accordance with these standards continues to be the OCh element (Optical Channel). This OCh element continues to be the basic element in the OTH (Optical Transport Hierarchy). The OCh element is a bidirectional circuit (by definition in the standards).

SUMMARY

According to a first aspect, there is provided an apparatus comprising bidirectional communications equipment for communicating information along optical fibers, wherein the bidirectional communications equipment is configured to provide a first unidirectional communication link from the equipment to a first location, and a second unidirectional communication link to the equipment from a different second location.

The bidirectional communications equipment (which can be a DWDM communication equipment incorporating multiplexers/demultiplexers, wavelength selective switches, optical amplifiers, etc.) may comprise a transmitter and receiver, the transmitter and receiver operable to:

i) provide a bidirectional communication link over an optical fiber pair with a transmitter and receiver of a second bidirectional communications equipment; and ii) alternatively provide a first unidirectional communication link between the transmitter of the first bidirectional communications equipment and the receiver of the second bidirectional communications equipment, and a second unidirectional communication link between the receiver of the first bidirectional communications equipment and a transmitter of a third bidirectional communications equipment.

The bidirectional communications equipment may be operable to provide the first unidirectional communication link with a different capacity than the second unidirectional communication link.

The first bidirectional communications equipment may be operable to use a different wavelength for the first and second unidirectional communication links.

Each bidirectional communications equipment may comprise (or consist exclusively of) a transmitter and receiver pair of a bidirectional interface card.

According to a second aspect, there is provided an optical network comprising first, second and third bidirectional communications equipment according to the first aspect, a first optical fiber link connecting a transmitter of the first bidirectional communications equipment and a receiver of the second bidirectional communications equipment, and a second optical fiber link connecting a receiver of the first bidirectional communications equipment and a transmitter of the third bidirectional communications equipment, wherein the optical network is configured with a first unidirectional communications link along the first optical fiber link and a second unidirectional communications link along the second optical fiber link.

The optical network may further comprise a third optical fiber connecting a transmitter of the second bidirectional communications equipment with a receiver of the third bidirectional communications equipment, the optical network configured with a third unidirectional communications link along the third optical fiber.

The second unidirectional communications link may differ from the first unidirectional communications link and/or the third unidirectional communications link in at least one of: wavelength, bandwidth, modulation scheme, forward error correction, and distance.

According to a third aspect, there is provided a method of configuring an optical network, the optical network comprising bidirectional communications equipment for providing a bidirectional communication link over an optical fiber pair, the method comprising provisioning unidirectional communication links using the bidirectional communications equipment.

The method may comprise increasing a capacity of an existing optical network by re-configuring the bidirectional communications equipment.

Re-configuring the bidirectional communications equipment may comprise changing software that controls provisioning of communication links to and from the bidirectional communications equipment to enable unidirectional links to be provisioned.

The method may comprise configuring optical fiber connections between the bidirectional communications equipment to establish unidirectional communications links between the bidirectional communications equipment.

Configuring the optical fiber connections may comprise:

providing a first optical fiber connecting a transmitter of a first selected bidirectional communications equipment and a receiver of a second selected bidirectional communications equipment, a second optical fiber connecting a receiver of the first selected bidirectional communications equipment and a transmitter of the third selected bidirectional communications equipment, and provisioning a first unidirectional communications link along the first optical fiber, and a second unidirectional communications link along the second optical fiber.

The first unidirectional communications link may have a different bandwidth than the second unidirectional communications link.

A first and second unidirectional communications link may be used to provision a bidirectional communications link between a first location and a second location, with the first unidirectional link having a different optical path than the second unidirectional communications link.

According to a fourth aspect, there is provided a non-transient computer readable medium comprising instructions that, when run on bidirectional communications equipment, causes the bidirectional communications equipment to be operable to provision unidirectional communication links.

According to a fifth aspect, there is provided a network, comprising: a plurality of bidirectional communications equipment, a network management server, and a data communications network connecting the network management server with the bidirectional communications equipment, wherein the server is configured to provision bidirectional communications links using the bidirectional communications equipment.

The features of any aspect may be combined with those of any other aspect.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

One aspect of this disclosure relates to the possibility to provision unidirectional circuits as the basic "circuit object" in an optical network, where the equipment is kept "bidirectional". The "bidirectional equipment" means, for example, that traffic interface cards are kept, as before, as transmit/receive interface cards. A difference from a hardware perspective may be in the optical cables on the client side or line side of the traffic interface cards of the optical network.

Figure 1:
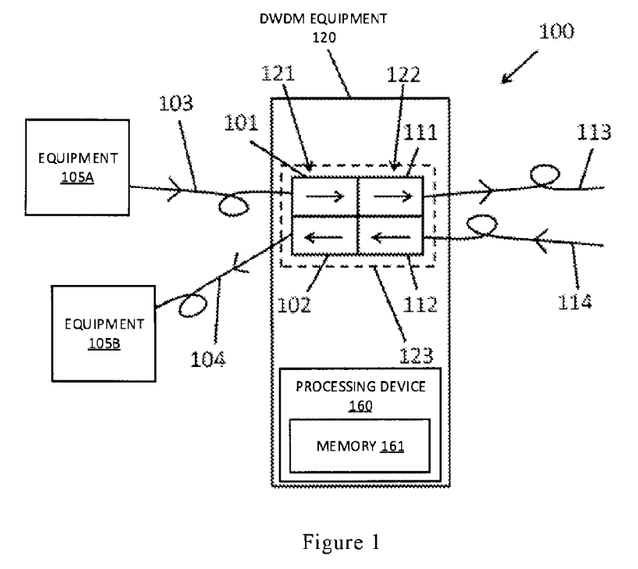
FIG. 1 illustrates an example network apparatus comprising DWDM equipment at the boundary of the optical network where the interface cards are located.

FIG. 1 illustrates an example network apparatus 100, comprising DWDM equipment 120 at the boundary of the optical network showing the client side 121 and the line side 122 of an optical interface card 123. The DWDM equipment 120 comprises bidirectional communications equipment, in the form of a bidirectional optical interface card 123. The client side 121 of the interface card 123 comprises a receiver 101 and a transmitter 102. The line side of the interface card 122 also comprises a receiver 112 and a transmitter 111. The DWDM equipment may further comprise other equipment (not represented in FIG. 1) such as optical amplifiers, multiplexers, demultiplexers, etc. . . . .

The DWDM equipment also comprises a processing device 160. The processing device 160 may control the configuration of the equipment 120, for instance provisioning communication links via the optical interface card 123. The processing device 160 executes instructions that may be loaded into a memory 161. The processing device 160 may include any suitable number(s) and type(s) of processors or other devices in any suitable arrangement. Example types of processing devices 160 include microprocessors, microcontrollers, digital signal processors, field programmable gate arrays, application specific integrated circuits, and discrete circuitry.

The memory 161 represents any structure(s) capable of storing and facilitating retrieval of information (such as data, program code, and/or other suitable information on a temporary or permanent basis). The memory 161 may represent a random access memory, read only memory, hard drive, Flash memory, optical disc, or any other suitable volatile or non-volatile storage device(s).

The processing device 160 may be connected to a data communications network (not shown in FIG. 1, but shown in more detail in FIG. 2), and may be instructed how to configure the equipment 120 via the data communications network.

A first cable 103 connects equipment 105A to the receiver 101 of the client side 121 of the interface card 123. A second cable 104 (e.g. an optical cable) connects equipment 105B to the transmitter 102 of the client side of the interface card 121. Equipment 105A can transmit network traffic (e.g. data) through the first cable 103 and the client side 121 of the interface card 123 into the line side 122 of the interface card 123 and into the optical network (via the line side 122 of the interface card 123). Equipment 105B can similarly receive network traffic from the line side 121 of the interface card 123 via the second cable 104 (e.g. an optical cable).

The line-side 121 of the bidirectional optical interface card 123 may be configured to provide a bidirectional optical communication link via first and second fibers 113, 114 of a fiber pair, receptively connected to the transmitter 111 and receiver 112. Alternatively, unidirectional communications links may be established over each of the first and second fibers 113, 114.

Optics is essentially unidirectional. This means that existing network elements such as in-line amplifiers (ILA), optical transport network (OTN) switches or reconfigurable optical add-drop multiplexers (ROADMs) have bidirectional architectures to support the provisioning of bidirectional circuits, but the optical functions/the optical modules operate on light which is propagating in one single direction. It is conventional to establish bidirectional circuits using fiber pairs in existing optical networks.

In each fiber of such a fiber pair, light propagates in one direction. Conventional optical amplifiers are unidirectional in nature. Even if it is possible to create "bidirectional" optical amplifiers, Erbium-doped fiber amplifiers (EDFAs) and Raman amplifiers have, thus far, been essentially deployed in optical networks in such a way that light propagates inside these amplifiers in one direction. Existing ROADM nodes have architectures that work in conjunction with fiber pairs, switching connections between fiber pairs.

Traffic interface cards have a transmit side and a receive side, since optical amplifiers and switching modules (e.g. wavelength selective switching (WSS) modules) are essentially unidirectional in nature. Today, the transmit side may be tunable, which means that it is possible to provision the card in order to tune the laser of the transmit side to emit on the desired optical frequency. Regarding the receive side, in the case of direct detection, the receive side is broadband, which means that it does not need to be tuned to be able to receive a particular incoming wavelength of the incoming optical channel. Instead, the receiver may be able to receive with a good performance any wavelength in the spectrum of transmission. In the case of coherent detection, there is a local oscillator/laser, which can be tunable and can be tuned to the incoming wavelength.

Figure 2:
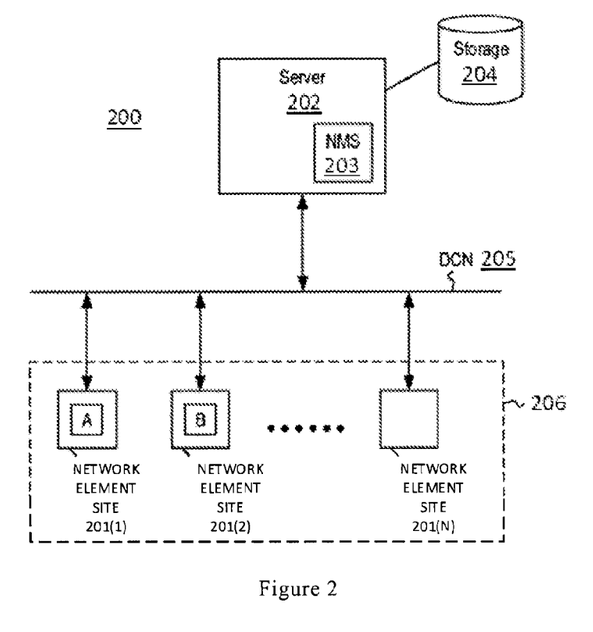
FIG. 2 illustrates an example network management environment.

FIG. 2 illustrates a network management environment 200, which includes various network elements. The network elements may comprise communications equipment (such as bidirectional interface cards, ROADMS, ILAs, OTAs etc) which may be configured as racks of electronics/optoelectronics. The different sites that include one or more of such network elements are labelled 201(2) through 201(N), where "N" is an integer representing the number of sites. Although each network site 201 may contain multiple network elements, for simplicity, only two network elements A and B are illustrated.

The network elements of the various network element sites 201 connect to a server 202 over a data communications network (DCN) 205. The server 202 runs thereon software which may be referred to as a network management system 203. More generally, a network management system 203 may be implemented on any suitable processor, as firmware, software, or hardware, provided it is capable of controlling the configuration of network elements to provision optical communications links.

The network elements within the various network element sites 201 are configured to provide a telecommunications network 206 in accordance with instructions received from the network management system 203. For example, ROADMs at various sites may be configured to establish unidirectional optical paths between specific ports of bidirectional interface cards in different network sites. The interface cards may be instructed to provision unidirectional or bidirectional communications links over the established optical paths, in order to satisfy a demand for communications capacity between those two sites. Bidirectional interface cards may receive commands specifying a modulation scheme or forward error correction scheme for each unidirectional (or bidirectional) communications link.

This data communications network 205 may be a private telecommunications network so as to prevent intrusion and possible disruptions to service in the telecommunication system served by the network elements of the network element sites 201.

The data communications network 205 may be an Internet Protocol (IP) based network, where each network element (and the server that runs the network management system 202) has a different IP address. The network management system 203 may have access to storage 204 of a large storage capacity, which is used to store large volumes of data (perhaps in a database) corresponding to the optical network. For instance, the network management system might cause performance monitoring data to be stored within the storage 204.

The design of network elements A and B may be such that it is possible to monitor quality of the transmission and to monitor a whole set of parameter settings of the hardware modules. These measurements may be stored in the storage 204 (which again could be organized in a database).

Figure 3:
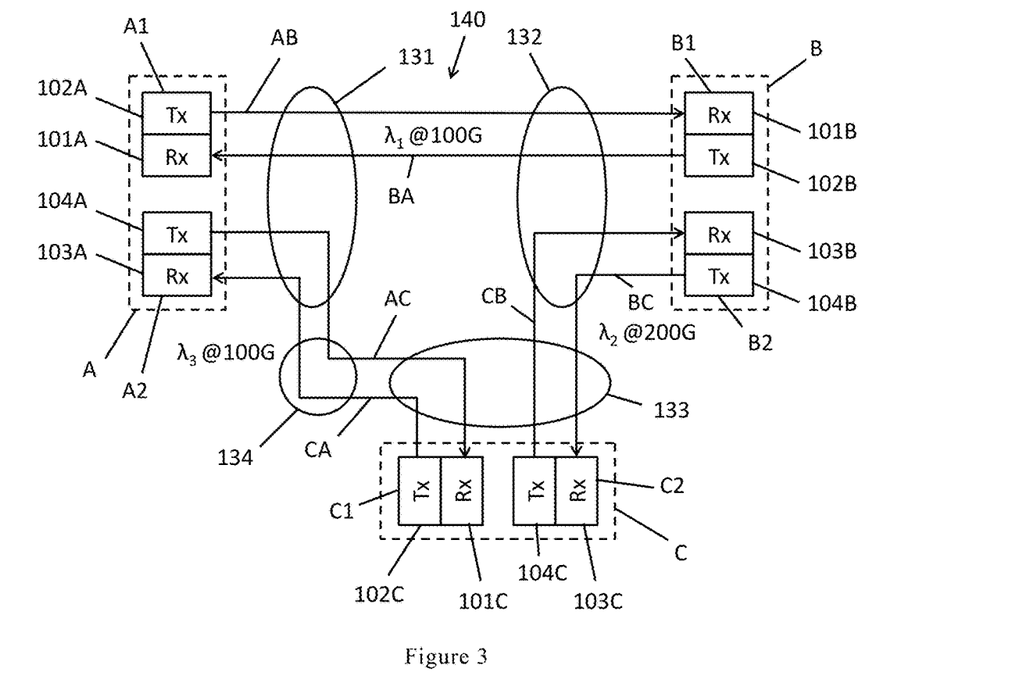
FIG. 3 illustrates an example optical network in which bidirectional connections are used to provide all the optical communications links.

FIG. 3 illustrates a network that is provisioned using bidirectional channels, using bidirectional communications equipment, in order to satisfy a demand for communications capacity from A to B (100G), from C to A (200G) and from B to C (100G). A number of bidirectional communication links may already link these locations, and the demand for additional capacity may arise from a recognition that traffic is asymmetric. According to existing optical communications standards, it is necessary to establish a bidirectional communications path between A and B, between B and C and between C and A, as shown in FIG. 3.

Bidirectional communications equipment A, B and C are respectively located in three separate locations (e.g. cities A, B and C). Each bidirectional equipment A, B, and C respectively comprises two bidirectional interface cards A1, A2; B1, B2; and C1, C2 (and may include other bidirectional interface cards (not shown).

In order to establish communications capacity between A and B using a conventional bidirectional communications link, a bidirectional optical path consisting of paired optical paths AB and BA connects bidirectional interface A1 with bidirectional interface B1. Similarly a bidirectional optical path consisting of paired optical paths AC and CA connects bidirectional interface A2 with bidirectional interface C1. A bidirectional optical path consisting of paired optical paths CB and BC connects bidirectional interface C2 with bidirectional interface B2. The optical paths of each pair follow the same path (e.g. provided by a fiber pair), and are connected pairwise at each ROADM, as mentioned above.

The optical fiber connections between A, B and C are routed via ROADMs 131-134. According to conventional optical communications standards, ROADMs 131-134 are operable to allow fiber-pair connections to be re-routed, to connect different bidirectional interfaces together.

The optical paths and bidirectional communications links in FIG. 3 may be established in response to instructions provided to the various network elements (A1, A2, B1, B2, C1, C2, 131, 132, 133, 134) from a network management system, as described with reference to FIG. 2 (but not shown in FIG. 3).

Using bidirectional communications equipment to provision the capacities requires the use of a total of 6 bidirectional interface cards (A1-C2), with 6 optical paths (AB-CA) between them.

Figure 4:
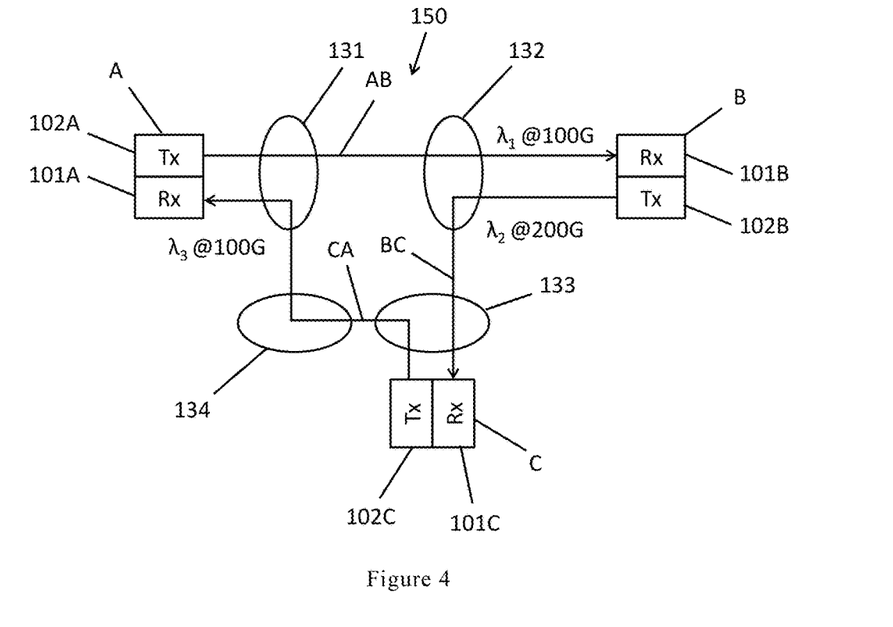
FIG. 4 shows an example of an optical network according to an embodiment of this disclosure.

FIG. 4 shows an example of an optical network 150 according to an embodiment of this disclosure, that is provisioned to satisfy the same capacity demand as the example of FIG. 3. The network 150 comprises bidirectional communications equipment at three different locations. The bidirectional communications equipment at each location respectively comprises a first, second and third bidirectional interface A, B and C. Each interface A, B, C respectively has a transmitter 102A, 102B, 102C and a receiver 101A, 101B, 101C. Each interface A, B, C may be, in hardware terms, a conventional bidirectional interface, such as is already widely installed in optical communications networks to provide bidirectional communications over fiber pairs. However, in contrast to the arrangement of FIG. 3, in the embodiment of FIG. 4 the bidirectional interfaces A, B, C are used to provision unidirectional communication links.

A first unidirectional communications link is provided from the transmitter 102A of the first interface A to the receiver 101B of the second interface B, via optical fiber link AB. A second unidirectional communications link is provided from the transmitter 102C of the third interface C to the receiver 101A of the first interface A, via optical fiber link CA. A third unidirectional communications link is provided from the transmitter 102B of the second interface B to the receiver 101C of the third interface C, via optical fiber link BC.

The optical links AB, CA, BC may comprise optical fiber spans that are interconnected by ROADMs 131-134, or other optical components (e.g. repeaters, etc.). In the present embodiment, the optical fiber link AB comprises a first fiber span connecting transmitter 102A to ROADM 131, a second fiber span connecting ROADM 131 with ROADM 132, and a third fiber span connecting ROADM 132 with receiver 101B. Optical fiber link CA comprises a fourth fiber span connecting transmitter 102C to ROADM 133, a fifth fiber span connecting ROADM 133 to ROADM 134, a sixth fiber span connecting ROADM 134 to ROADM 131, and a seventh fiber span connecting ROADM 131 to receiver 101A. Optical fiber link BC comprises an eighth fiber span connecting transmitter 102B to ROADM 132, a ninth fiber span connecting ROADM 132 to ROADM 133, and a tenth fiber span connecting ROADM 133 to receiver 101C.

The bidirectional communications equipment at each location may be provided with further bidirectional interfaces, which may be configured to provide bidirectional communication channels, or further unidirectional communication channels, depending on the needs of the network.

The optical carriers in the unidirectional communication links provided by a single bidirectional communications interface (A, B or C) may have different optical frequencies or wavelengths, and they may also carry different capacities/bandwidths, have different modulation formats, and/or different forward error correction (FEC) codes.

In the example of FIG. 4, there may be a relatively short distance from B to C, enabling a modulation scheme with increased bandwidth (e.g. 200G, i.e. 200 gigabits per second) to be used for the third unidirectional communications link. The distance from A to B may preclude a 200G link, so the first unidirectional communications link may be configured as a 100G link. In the example, the first and third communications links are also configured with different wavelengths $\lambda_1$ and $\lambda_3$, respectively. The bidirectional interface B therefore provides unidirectional communications links with different bandwidths and wavelengths. The second unidirectional communications link uses a wavelength $\lambda_2$ that is different to $\lambda_1$ and $\lambda_3$.

The optical paths and bidirectional communications links in FIG. 4 may be established in response to instructions provided to the various network elements (A B, C, 131, 132, 133, 134) from a network management system, as described with reference to FIG. 2 (but not shown in FIG. 4).

In FIG. 4, using the principles disclosed herein, only three bidirectional interfaces and only three optical paths are necessary to provide the required capacity, which is in contrast to FIG. 3, which requires six bidirectional interfaces and six optical paths. The cost of establishing enhanced capacity according to embodiments is therefore substantially decreased.

It can be understood from comparing FIG. 4 with FIG. 3 that the a network similar to that of FIG. 2 can be reconfigured according to an embodiment with little or no hardware modifications, provided that the management software of the various elements of the network (e.g. interfaces, ROADMs, etc.) is capable of provisioning unidirectional optical channels. If the ROADMs are configured to switch single fibers, rather than fiber pairs, then unidirectional fiber links can be established arbitrarily by the ROADMs between transmitters and receivers of different bidirectional interfaces. Where the bidirectional communications equipment comprises a plurality of bidirectional interfaces, some can be configured to provide conventional bidirectional communications links and others to provide unidirectional communications links, potentially leaving a "spare" unidirectional communications port (from which a communications link can be established) that can be provisioned for a different route.

Embodiments of the disclosure therefore enable an optical network in which existing bidirectional equipment is able to provision unidirectional circuits. Embodiments may reside in a significant modification of the objects manipulated by the management software that controls provisioning of optical communication links (or channels) and also of software that controls the operation of the network elements themselves (such as ROADMs and interface cards).

A network or apparatus configured in accordance with an embodiment does not follow existing ITU-T standards, because the concept of Optical Channel (OCh), which is the fundamental element of optical communications networks according to existing standards, needs to be drastically changed. Optical network standards are found on the ITU-T website. Relevant documents include the G Recommendations: G.692, G.709 and G.853.1.

In contrast with conventional systems, one fundamental element for network provisioning and management in embodiments of this disclosure is a unidirectional oriented optical channel, which may be denoted UOCh. UOCh(A,B) designates a unidirectional oriented channel from A to B. This may be the fundamental unit which is to be provisioned in accordance with embodiments of this disclosure.

A bidirectional optical channel may also be able to be provisioned: BOCh(A,B). Such a bidirectional channel may not be only the sum of two unidirectional optical channels traveling in opposite directions along the same path. In embodiments, a bidirectional channel may be established or provisioned using different optical paths (i.e. with a different topology, traversing different nodes of the network). The ability to use different optical paths for each direction in a bidirectional optical path provides for a wider range of possibilities for establishing optical restoration or optical protection (because of the far greater permutations of optical paths that may be available). This is in contrast to existing bidirectional communications channels OCh in which protection paths in both directions stay together.

Moreover, in the hierarchy of the organization of the objects managed at the network management level (similar to the optical transport hierarchy), one can also consider "groups" of unidirectional (UOCh) or bidirectional (BOCh) optical channels. These groups of optical channels may also be treated the same way with respect to optical protection and restoration.

Embodiments of this disclosure are able, by an appropriate network management architecture and set of objects manipulated, to create an optical network using bidirectional equipment to create the network elements in which it is possible to provision circuits that are either unidirectional (UOCh) or bidirectional (BOCh).

According to an embodiment of this disclosure, it is possible to combine easily in the same network asymmetric circuits/optical channels and symmetric circuits/optical channels. This provides economic benefits (e.g. network cost) that are even greater than those achievable with conventional approaches.

In order to maximise these benefits, network planning can be adapted to the approach of unidirectional circuits. This will provide benefits by reducing congestion and making better use of network resources. Embodiments may also provide benefits in terms of protection and restoration at the network level. According to embodiments of this disclosure, asymmetric traffic may be provisioned with a maximum granularity. For example: one can provide different bandwidths for each of the two traffic directions . . . 100G/200G, 100G/300G, 100G/400G, 100G/500G, 200G/300G, 300G/400G, etc. (here it is assumed the granularity for optical channels is 100G).

In order to more clearly demonstrate the advantages associated with embodiments of this disclosure, the concepts disclosed herein were applied to a simulated US-wide optical network.

The network simulations were done using a modified version of the open source tool Net2Plan (developed at Universidad Politécnica de Cartagena, Spain) as a framework. For this study, the continental US reference network CORONET was used. A full mesh set of bidirectional IP traffic demands were generated between eleven areas of data centers. The traffic weighting and locations of these data centers were allocated between the following 11 cities: NYC (241 data centers), Washington D.C. (196), San Francisco (178), Los Angeles (153), Dallas (150), Chicago (141), Atlanta (84), Seattle (72), Miami (67), Phoenix (62), and Houston (60).

Three optical line system configurations were simulated to show benefits of reach and spectral bandwidth: a 90-channel EDFA-only configuration with 2000 km reach, a 90-channel hybrid EDFA/Raman configuration with 4500 km reach, and a 150-channel all-Raman configuration with 3800 km reach. The reachability figures for the three line systems are based upon the current generation coherent 100G DP-QPSK (dual polarisation quadrature phase shift keyed) modulation format at 50 GHz channel-spacing with an average of 92 km spans between in-line amplification sites. The reachability distances were determined by OSNR benefits of the hybrid EDFA/Raman system: approximately 2.5 times the reachability at short wavelength compared to the EDFA-only solution. For the all-Raman system, additional penalties for L-band are considered which reduces the reachability to 3800 km.

For each of the three optical line system configurations, two simulation sets were done for accommodating the generated IP-traffic demands (each set including simulations of EDFA only, all Raman, and hybrid optical line system configuration). The first simulation set was done with the typical bidirectional optical channel circuit configurations that are currently deployed in DWDM long-haul optical networks. The second simulation set employed a network configured in accordance with an embodiment, allowing for provisioning of unidirectional optical channels using bidirectional network elements. Both simulations used the same set of transponder equipment, with the only difference being how the software configures the provisioning and management of optical channels/communication links.

Figure 5:
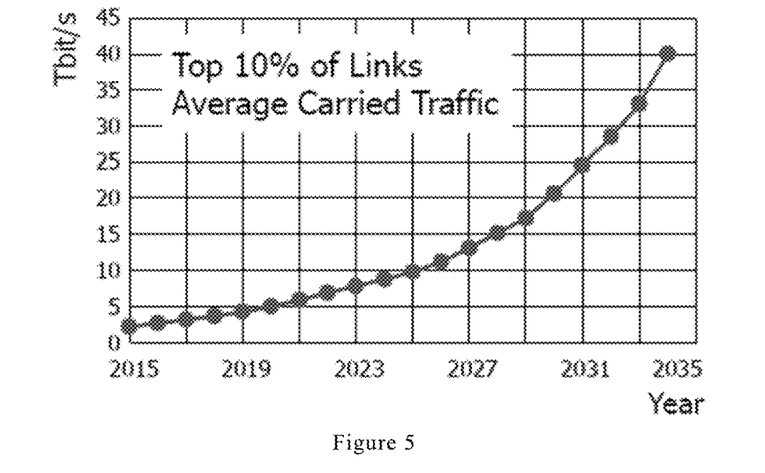
FIGS. 5 through 8 illustrate example simulation results associated with an optical network according to an embodiment of this disclosure.

FIG. 5 shows a graph illustrating the average carried traffic in the busiest 10% of links in the network. A moderate traffic growth was assumed, matching the top 10% of the busiest routes in the simulated network with the traffic growth expected in Metro Network Traffic Growth: An Architecture Impact Study, Alcatel-Lucent Bell Labs White Paper, December 2013. This study uses an 18.8% percent IP-traffic growth year-over-year throughout the network over a twenty-year period.

Within the simulation, a full-mesh of IP-traffic demands are generated between data centres, with an average asymmetry ratio of 0.5. An asymmetry ratio of 0.5 indicates that there is twice as much IP-traffic flowing in one direction compared to the opposite direction of the demand. In the simulations, this asymmetry ratio is uniformly distributed between 0.25 and 0.75 and the direction of asymmetry is randomized. The traffic demands are routed with Dijkstra's shortest-path algorithm.

A variety of network design metrics are the output from these simulations including total IP-traffic, total optical channel traffic, total number of transponders, spectrum utilization, bottleneck link utilization, transponder port utilization, route quality, and yearly and cumulative summaries of total network cost. Total costs of the network are composed of fiber leasing costs, operations and maintenance costs, space and power costs, in-line amplification equipment costs, ROADM site costs, and transponder costs.

The capacity on the top 10% of the busiest routes in the simulated network exceeds the capacity offered by EDFA-only or hybrid EDFA/Raman configurations in 2024 (assuming 100G channels). At this point in time, the total spectrum usage across the whole network (and not only for the busiest routes) is about 53% for EDFA-only or hybrid EDFA/Raman configurations and 31% for all-Raman equipment. All-Raman amplification provides high bandwidth by offering more room for optical channels, thus delaying the need to equip new fiber pairs (which leads to the need to deploy and operate additional common equipment) to meet capacity demands on the busiest routes.

In addition, the long reach capability enabled by Raman amplification reduces the number of regeneration sites required over long optical data paths, leading to a reduction of about 20% in the number of transponder cards throughout the network. The difference in the number of transponder cards between hybrid EDFA/Raman (4500 km reach) and all-Raman (3800 km reach) amplification schemes is only about 3%.

Figure 6:
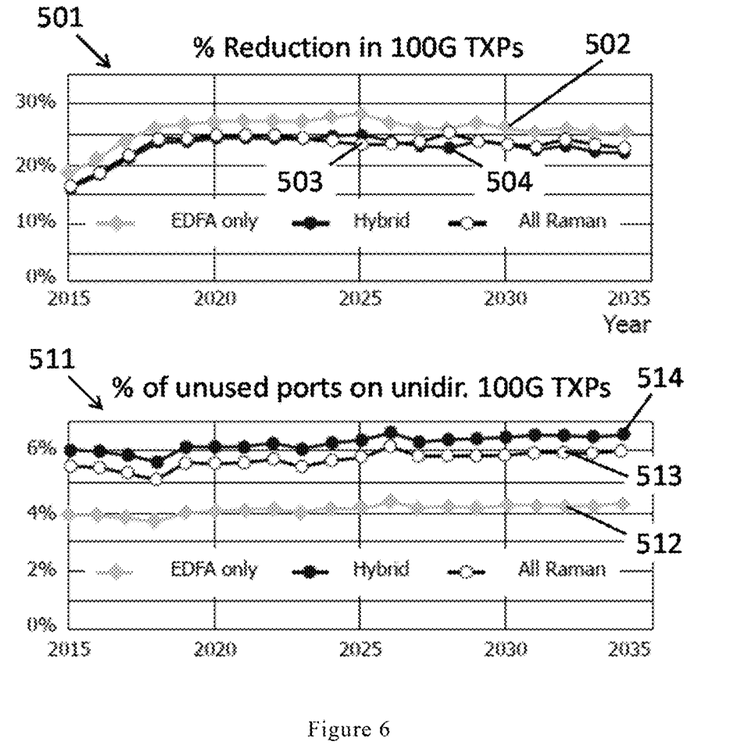

FIG. 6 includes a graph 501 illustrating the reduction in 100G network transponders for the second set of simulations (cf the first set) for configurations with: EDFA only 502, all Raman amplification 503 and hybrid amplification 504. Savings of 15-25% in network transponders can be made according to some embodiments. The capability to provision unidirectional optical communication links makes more efficient use of network hardware, including fiber links between locations which may be very expensive to establish.

FIG. 6 also includes a graph 511, illustrating the number of unused ports in transponders in the second set of simulations for configurations with: EDFA only 512, all Raman amplification 513, and hybrid amplification 514. The interface cards of the DWDM platform according to some embodiments are equipped with both transmit and receive ports, and when these are provisioned unidirectionally, it may happen that one of the ports is not used. Between approximately 4 and 6% of ports are unused in the simulated network configurations of the second set, indicating that ports are available to provide bandwidth on demand, for example to respond to an increased demand for communication.

In DWDM equipment according to an embodiment of this disclosure, unidirectional optical circuits can be provisioned using customary bidirectional interface cards: an interface card in node A can transmit an optical wavelength to node B while the transmit port of the interface card in node B can transmit an optical wavelength to another node different from A. Such a DWDM configuration may not require any new hardware development or evolution but may require a software architecture enabling provision of OCh in different ways (unidirectional or bidirectional depending on the traffic needs). The proposed IP-optimized DWDM platform therefore does not induce significant extra hardware costs that might be incurred using conventional approaches.

Figure 7:
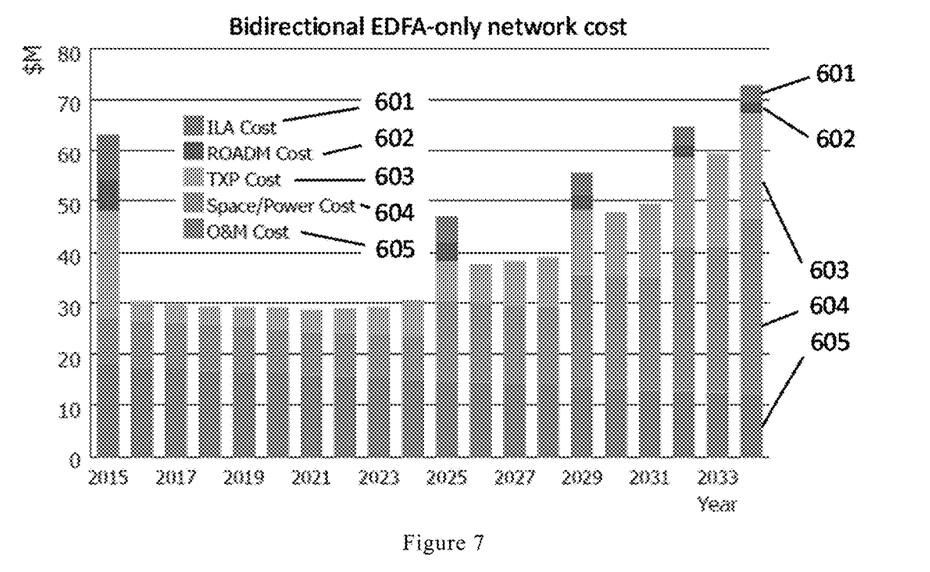
Figure 8:
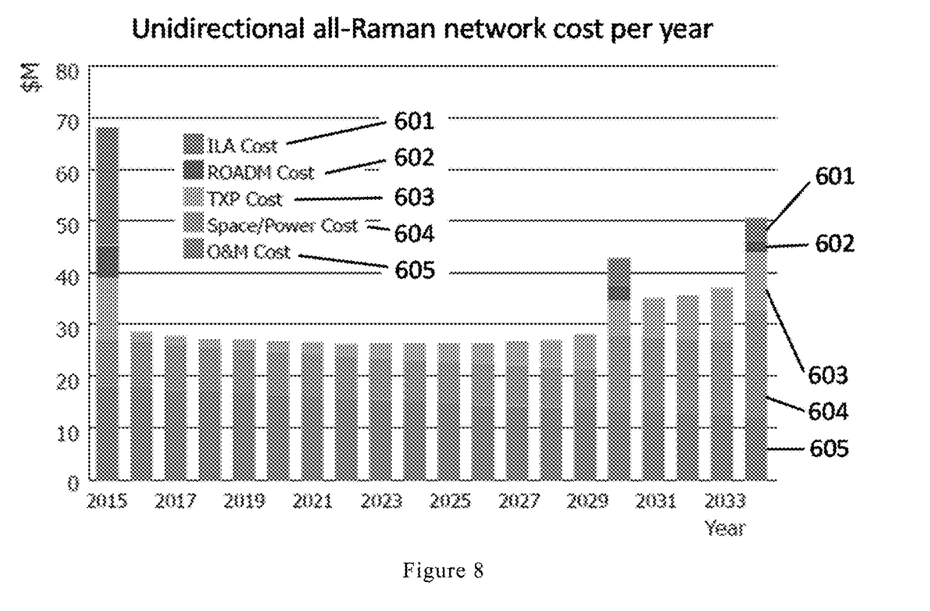

FIGS. 7 and 8 illustrate the simulated cost savings in accordance with an embodiment of this disclosure. FIG. 7 illustrates network cost projections for a conventional EDFA-only network in which the fundamental channel OCh is bidirectional. FIG. 7 illustrates network cost projections for a network according to an embodiment of this disclosure, using all-Raman amplification, in which bidirectional communication equipment can be configured to provide unidirectional communication links, as appropriate. In both cases it is assumed that the operators own the fiber infrastructure in a CORONET-like network.

The costs are driven by the equipment capital expenses (for ILAs 601; ROADMs 602; and transponders TXP 603) and operational expenses (space and power 604; operation and maintenance 605). The extra cost required in the first year for longer reach and higher bandwidth that is enabled by all-Raman amplification is partly compensated by the lower number of transponders in the unidirectional all-Raman network approach; this extra cost is quickly recouped after two years of operation with yearly savings ranging from \$2M to \$29M, the highest savings being observed in the years (e.g. 2025, 2029, 2031, 2034) when new fiber pairs need to be lit in the bidirectional EDFA-only network to respond to the traffic growth.

Cost figures for the DWDM equipment are based on Ovum data showing average selling prices in industry for the equipment as well as a yearly reduction based on forecasts. Operation, maintenance, space, power, and fiber leasing expenses are based on network data such as a monthly lease within a 20-year IRU (indefeasible right of use). Different cases have been studied, including operators leasing the fiber infrastructure or operators who own the fiber infrastructure. Pan-European networks have been studied as well.

Unidirectional provisioning using bidirectional equipment can reduce the number of transponders across a network, reduce the number of fibers required, and lead to a lower network cost for operators owning or leasing the fiber infrastructure.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of the invention as defined by the following claims.

What is claimed is:

1. An apparatus comprising:
   first bidirectional communications equipment comprising a transmitter and a receiver, wherein the first bidirectional communications equipment is configured to operate in at least a first configuration and a second configuration;
   wherein, in the first configuration, the first bidirectional communications equipment is configured to provide a bidirectional communication link with a transmitter and a receiver of second bidirectional communications equipment; and
   wherein, in the second configuration, the first bidirectional communications equipment is configured to provide (i) a first unidirectional communication link between the transmitter of the first bidirectional communications equipment and the receiver of the second bidirectional communications equipment and (ii) a second unidirectional communication link between the receiver of the first bidirectional communications equipment and a transmitter of third bidirectional communications equipment.

2. The apparatus of claim 1, wherein, in the second configuration, the first bidirectional communications equipment is configured to provide the first unidirectional communication link with a different capacity or bandwidth than the second unidirectional communication link.

3. The apparatus of claim 1, wherein, in the second configuration, the first bidirectional communications equipment is configured to use different frequencies or wavelengths for the first and second unidirectional communication links.

4. The apparatus of claim 1, wherein, in the second configuration, the first bidirectional communications equipment is configured to use different forward error correction (FEC) codes for the first and second unidirectional communication links.

5. The apparatus of claim 1, wherein, in the second configuration, the first bidirectional communications equipment is configured to use different modulation formats for the first and second unidirectional communication links.

6. The apparatus of claim 1, wherein the first bidirectional communications equipment further comprises additional bidirectional interfaces configured to provide additional bidirectional or unidirectional communication channels.

7. The apparatus of claim 1, wherein the first bidirectional communications equipment comprises an optical interface card, the optical interface card comprising the transmitter and the receiver of the first bidirectional communications equipment.

8. The apparatus of claim 1, wherein the first and second unidirectional communication links provision a bidirectional link between a first location at which the first bidirectional communications equipment is located and a second location, the first unidirectional communication link having a different optical path than the second unidirectional communication link.

9. A method comprising:
   configuring first bidirectional communications equipment to operate in one of a first configuration of the first bidirectional communications equipment or a second configuration of the first bidirectional communications equipment;
   wherein the first bidirectional communications equipment comprises a transmitter and a receiver;
   wherein, in the first configuration, the first bidirectional communications equipment is configured to provide a bidirectional communication link with a transmitter and a receiver of second bidirectional communications equipment; and
   wherein, in the second configuration, the first bidirectional communications equipment is configured to provide (i) a first unidirectional communication link between the transmitter of the first bidirectional communications equipment and the receiver of the second bidirectional communications equipment and (ii) a second unidirectional communication link between the receiver of the first bidirectional communications equipment and a transmitter of third bidirectional communications equipment.

10. The method of claim 9, wherein, in the second configuration, the first bidirectional communications equipment is configured to provide the first unidirectional communication link with a different capacity or bandwidth than the second unidirectional communication link.

11. The method of claim 9, wherein, in the second configuration, the first bidirectional communications equipment is configured to use different frequencies or wavelengths for the first and second unidirectional communication links.

12. The method of claim 9, wherein, in the second configuration, the first bidirectional communications equipment is configured to use different forward error correction (FEC) codes for the first and second unidirectional communication links.

13. The method of claim 9, wherein, in the second configuration, the first bidirectional communications equipment is configured to use different modulation formats for the first and second unidirectional communication links.

14. The method of claim 9, wherein the first and second unidirectional communication links provision a bidirectional link between a first location at which the first bidirectional communications equipment is located and a second location, the first unidirectional communication link having a different optical path than the second unidirectional communication link.

15. A non-transient computer readable medium comprising instructions that, when executed, are configured to:
    configure first bidirectional communications equipment to operate in one of a first configuration of the first bidirectional communications equipment or a second configuration of the first bidirectional communications equipment;
    wherein the first bidirectional communications equipment comprises a transmitter and a receiver;
    wherein, in the first configuration, the first bidirectional communications equipment is configured to provide a bidirectional communication link with a transmitter and a receiver of second bidirectional communications equipment; and
    wherein, in the second configuration, the first bidirectional communications equipment is configured to provide (i) a first unidirectional communication link between the transmitter of the first bidirectional communications equipment and the receiver of the second bidirectional communications equipment and (ii) a second unidirectional communication link between the receiver of the first bidirectional communications equipment and a transmitter of third bidirectional communications equipment.

16. The non-transient computer readable medium of claim 15, wherein, in the second configuration, the first bidirectional communications equipment is configured to provide the first unidirectional communication link with a different capacity or bandwidth than the second unidirectional communication link.

17. The non-transient computer readable medium of claim 15, wherein, in the second configuration, the first bidirectional communications equipment is configured to use different frequencies or wavelengths for the first and second unidirectional communication links.

18. The non-transient computer readable medium of claim 15, wherein, in the second configuration, the first bidirectional communications equipment is configured to use different forward error correction (FEC) codes for the first and second unidirectional communication links.

19. The non-transient computer readable medium of claim 15, wherein, in the second configuration, the first bidirectional communications equipment is configured to use different modulation formats for the first and second unidirectional communication links.

20. The non-transient computer readable medium of claim 15, wherein the instructions are executed by a network management system.

* * * * *